United States Patent
Na

(10) Patent No.: US 11,688,137 B2
(45) Date of Patent: Jun. 27, 2023

(54) METHOD AND APPARATUS FOR RENDERING 3D POLYGON MESHES USING MULTI-VIEW TEXTURES

(71) Applicant: FXGEAR INC., Seoul (KR)

(72) Inventor: Kyung Gun Na, Seoul (KR)

(73) Assignee: FXGEAR INC., Seoul (KR)

( * ) Notice: Subject to any disclaimer, the term of this patent is extended or adjusted under 35 U.S.C. 154(b) by 0 days.

(21) Appl. No.: 17/462,460

(22) Filed: Aug. 31, 2021

(65) Prior Publication Data

US 2023/0033968 A1 Feb. 2, 2023

(30) Foreign Application Priority Data

Jul. 22, 2021 (KR) ........................ 10-2021-0096720

(51) Int. Cl.
*G06T 17/20* (2006.01)
*G06T 7/90* (2017.01)
*G06T 7/40* (2017.01)
*G06T 15/20* (2011.01)

(52) U.S. Cl.
CPC ............... *G06T 17/20* (2013.01); *G06T 7/40* (2013.01); *G06T 7/90* (2017.01); *G06T 15/205* (2013.01)

(58) Field of Classification Search
None
See application file for complete search history.

(56) References Cited

U.S. PATENT DOCUMENTS

| | | | |
|---|---|---|---|
| 10,872,457 B1* | 12/2020 | Hu | G06T 15/506 |
| 2009/0016582 A1* | 1/2009 | Penn | A61B 5/7435 |
| | | | 382/128 |
| 2015/0206337 A1* | 7/2015 | Roimela | G06T 11/60 |
| | | | 345/419 |
| 2017/0213385 A1* | 7/2017 | Yu | H04N 7/185 |
| 2019/0043253 A1* | 2/2019 | Lucas | G06T 9/001 |
| 2020/0211255 A1* | 7/2020 | Elg | G06T 15/04 |
| 2022/0198710 A1* | 6/2022 | Kuang | G06T 7/80 |

FOREIGN PATENT DOCUMENTS

JP 2019-215622 A 12/2019

* cited by examiner

*Primary Examiner* — Anh-Tuan V Nguyen
(74) *Attorney, Agent, or Firm* — Bridgeway IP Law Group, PLLC; Hyun Woo Shin

(57) ABSTRACT

An apparatus for rendering a three-dimensional (3D) polygon mesh includes a processor, and a memory storing instructions, wherein the processor is configured to execute the instructions to obtain a plurality of multi-view images corresponding to a plurality of captured images obtained by capturing an object at different capture camera positions, obtain a 3D polygon mesh for the object, select one or more of the plurality of multi-view images as one or more texture images based on a render camera position and capture camera positions of the plurality of multi-view images, and render the 3D polygon mesh as a two-dimensional (2D) image based on the selected one or more texture images.

18 Claims, 11 Drawing Sheets

METHOD AND APPARATUS FOR RENDERING 3D POLYGON MESHES USING MULTI-VIEW TEXTURES

BACKGROUND

1. Field

Various embodiments of the disclosure relate to a method and apparatus for rendering three-dimensional (3D) polygon meshes using multi-view textures.

2. Description of the Related Art

With the development of 3D graphic technology, a technology of 3D modeling a real object and rendering the real object as a two-dimensional (2D) image has been developed. In particular, recently, a method of 3D modeling a real object by using a plurality of captured images obtained by photographing the real object at various positions has been widely used.

SUMMARY

One or more embodiments of the disclosure include a method and apparatus for rendering three-dimensional (3D) polygon meshes using multi-view textures to obtain an image close to an actual image.

Additional aspects will be set forth in part in the description which follows and, in part, will be apparent from the description, or may be learned by practice of the presented embodiments of the disclosure.

According to one or more embodiments of the disclosure, an apparatus for rendering a three-dimensional (3D) polygon mesh includes a processor, and a memory storing instructions, wherein the processor is configured to execute the instructions, to obtain a plurality of multi-view images corresponding to a plurality of captured images obtained by capturing an object at different capture camera positions, obtain a 3D polygon mesh for the object, select one or more of the plurality of multi-view images as one or more texture images based on a render camera position and capture camera positions of the plurality of multi-view images, and render the 3D polygon mesh as a two-dimensional (2D) image based on the selected one or more texture images.

Each of the plurality of multi-view images and the 2D image may include an alpha channel, wherein the processor may be further configured to execute the instructions to determine alpha values of the 2D image based on alpha values of the selected one or more texture images.

The processor may be further configured to execute the instructions to determine a weight of each of the plurality of multi-view images based on the render camera position and the capture camera positions of the plurality of multi-view images, and select one or more of the plurality of multi-view images as the one or more texture images based on the weights of the plurality of multi-view images.

The processor may be further configured to execute the instructions to determine the weights such that an error between a weighted sum of capture camera position vectors of the plurality of multi-view images based on a position of a first point of the 3D polygon mesh according to the weights and a render camera position vector based on the position of the first point is minimized.

The processor may be further configured to execute the instructions to select one or more of the plurality of multi-view images as one or more first texture images based on a position of a first point of the 3D polygon mesh, the render camera position, and the capture camera positions of the plurality of multi-view images, render the first point into the 2D image based on the selected one or more first texture images, select one or more of the plurality of multi-view images as one or more second texture images based on a position of a second point of the 3D polygon mesh, the render camera position, and the capture camera positions of the plurality of multi-view images, and render the second point into the 2D image based on the selected one or more second texture images.

The processor may be further configured to execute the instructions to select one or more of the plurality of multi-view images as the one or more first texture images based on the render camera position relative to the position of the first point and the capture camera positions of the plurality of multi-view images relative to the position of the first point, and select one or more of the plurality of multi-view images as the one or more second texture images based on the render camera position relative to the position of the second point and the capture camera positions of the plurality of multi-view images relative to the position of the second point.

The processor may be further configured to execute the instructions to determine a first weight of each of the plurality of multi-view images based on the position of the first point, the render camera position, and the capture camera positions of the plurality of multi-view images, select one or more of the plurality of multi-view images as the one or more first texture images based on the first weights, determine a second weight of each of the plurality of multi-view images based on the position of the second point, the render camera position, and the capture camera positions of the plurality of multi-view images, and select one or more of the plurality of multi-view images as the one or more second texture images based on the second weights.

The processor may be further configured to execute the instructions to determine the first weights based on the render camera position relative to the position of the first point and the capture camera positions of the plurality of multi-view images relative to the position of the first point, and determine the second weights based on the render camera position relative to the position of the second point and the capture camera positions of the plurality of multi-view images relative to the position of the second point.

The processor may be further configured to execute the instructions to determine the first weights such that an error between a weighted sum of capture camera position vectors of the plurality of multi-view images based on the position of the first point according to the first weights and a render camera position vector based on the position of the first point is minimized, and determine the second weights such that an error between a weighted sum of capture camera position vectors of the plurality of multi-view images based on the position of the second point according to the second weights and a render camera position vector based on the position of the second point is minimized.

The processor may be further configured to execute the instructions to determine one or more first texture points on the one or more texture images corresponding to a first point of the 3D polygon mesh by re-projecting the first point of the 3D polygon mesh onto each of the one or more texture images, and determine a color of a first rendering point on the 2D image corresponding to the first point based on colors of the one or more first texture points.

The processor may be further configured to execute the instructions to obtain camera parameters determined in a process of generating the 3D polygon mesh through 3D reconstruction based on the plurality of captured images, and perform the re-projection by using the camera parameters.

Each of the plurality of multi-view images and the 2D image may include an alpha channel, wherein the processor may be further configured to execute the instructions to determine an alpha value of the first rendering point based on alpha values of the one or more first texture points.

The processor may be further configured to execute the instructions to determine a weight of each of the one or more texture images based on the render camera position and capture camera positions of the one or more texture images, and determine a color of the first rendering point based on the weights and colors of the one or more first texture points.

Each of the plurality of multi-view images and the 2D image may include an alpha channel, wherein the processor may be further configured to execute the instructions to determine an alpha value of the first rendering point based on the weights and alpha values of the one or more first texture points.

The processor may be further configured to execute the instructions to determine the weights based on an error between a weighted sum of capture camera position vectors of the one or more texture images based on a position of the first point according to the weights and a render camera position vector based on the position of the first point.

The processor may be further configured to execute the instructions to determine a first weight of each of the one or more texture images based on a position of the first point, the render camera position, and the capture camera positions of the one or more texture images, determine a color of the first rendering point based on the first weights and the colors of the one or more first texture points, determine one or more second texture points on the one or more texture images corresponding to a second point of the 3D polygon mesh by re-projecting the second point of the 3D polygon mesh onto each of the one or more texture images, determine a second weight of each of the one or more texture images based on a position of the second point, the render camera position, and the capture camera positions of the one or more texture images, and determine a color of a second rendering point on the 2D image corresponding to the second point based on the second weights and colors of the one or more second texture points.

The processor may be further configured to execute the instructions to determine the first weights based on the render camera position relative to the position of the first point and capture camera positions of the one or more texture images relative to the position of the first point, and determine the second weights based on the render camera position relative to the position of the second point and capture camera positions of the one or more texture images relative to the position of the second point.

The processor may be further configured to execute the instructions to determine the first weights based on an error between a weighted sum of capture camera position vectors of the one or more text images based on the position of the first point according to the first weights and a render camera position vector based on the position of the first point, and determine the second weights based on an error between a weighted sum of capture camera position vectors of the one or more text images based on the position of the second point according to the second weights and a render camera position vector based on the position of the second point.

According to one or more embodiments of the disclosure, an operating method of an apparatus for rendering a three-dimensional (3D) polygon mesh includes obtaining a plurality of multi-view images corresponding to a plurality of captured images obtained by capturing an object at different capture camera positions, obtaining a 3D polygon mesh for the object, selecting one or more of the plurality of multi-view images as one or more texture images based on a render camera position and capture camera positions of the plurality of multi-view images, and rendering the 3D polygon mesh as a two-dimensional (2D) image based on the selected one or more texture images.

According to one or more embodiments of the disclosure, there is provided a non-transitory computer-readable recording medium having recorded thereon a program for executing the operating method.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
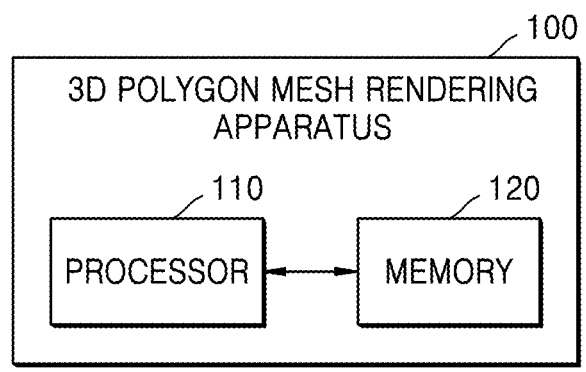
FIG. 1 is a schematic block diagram of an apparatus for rendering three-dimensional (3D) polygon meshes (hereinafter, referred to as a 3D polygon mesh rendering apparatus), according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, preferred embodiments of the disclosure will be described in detail with reference to the accompanying drawings in order to clarify the technical idea of the disclosure. While describing the disclosure, detailed description of related well-known functions or configurations may be omitted when it is deemed that they may unnecessarily obscure the essence of the disclosure. Components having substantially the same functional configuration among the drawings are assigned the same reference numerals and reference characters as possible even though they are indicated on different drawings. If necessary for convenience of explanation, an apparatus and a method will be described together. Each operation of the disclosure does not necessarily have to be performed in the order described, and may be performed in parallel, selectively, or individually.

FIG. 1 is a schematic block diagram of an apparatus 100 for rendering three-dimensional (3D) polygon meshes (hereinafter, referred to as a 3D polygon mesh rendering apparatus 100), according to an embodiment of the disclosure. Referring to FIG. 1, the 3D polygon mesh rendering apparatus 100 may include a processor 110 and a memory 120 for storing one or more instructions that may be executed by the processor 110. The processor 110 may include one processor or a plurality of processors. The memory 120 may include one memory or a plurality of memories. An operation of the 3D polygon mesh rendering apparatus 100, which is performed by the processor 110 by executing one or more instructions stored in the memory 120, will be described in detail below with reference to FIGS. 2 to 8.

Figure 2:
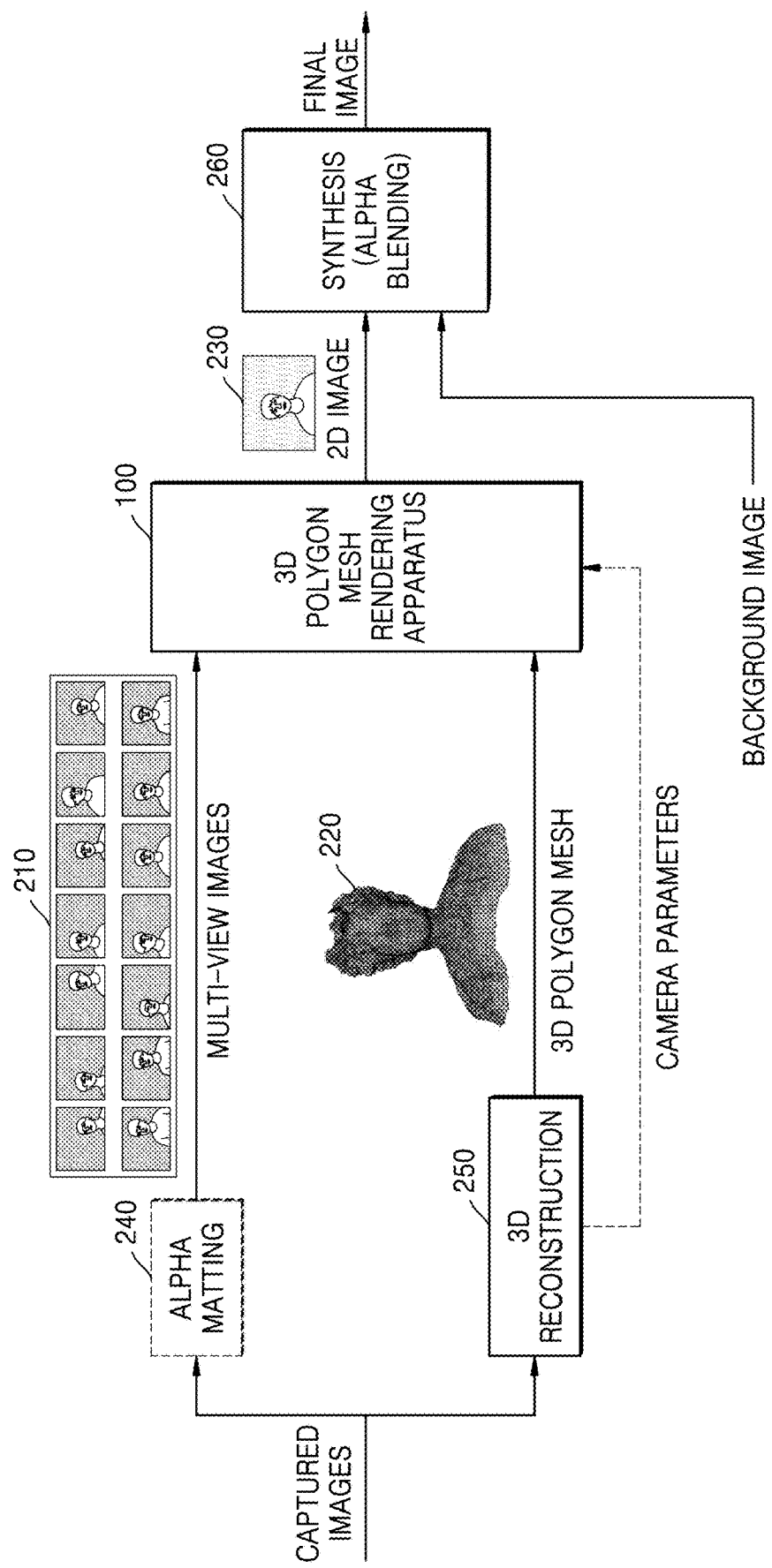
FIG. 2 is a diagram illustrating an operation of a 3D polygon mesh rendering apparatus according to an embodiment of the disclosure.
Figure 3:
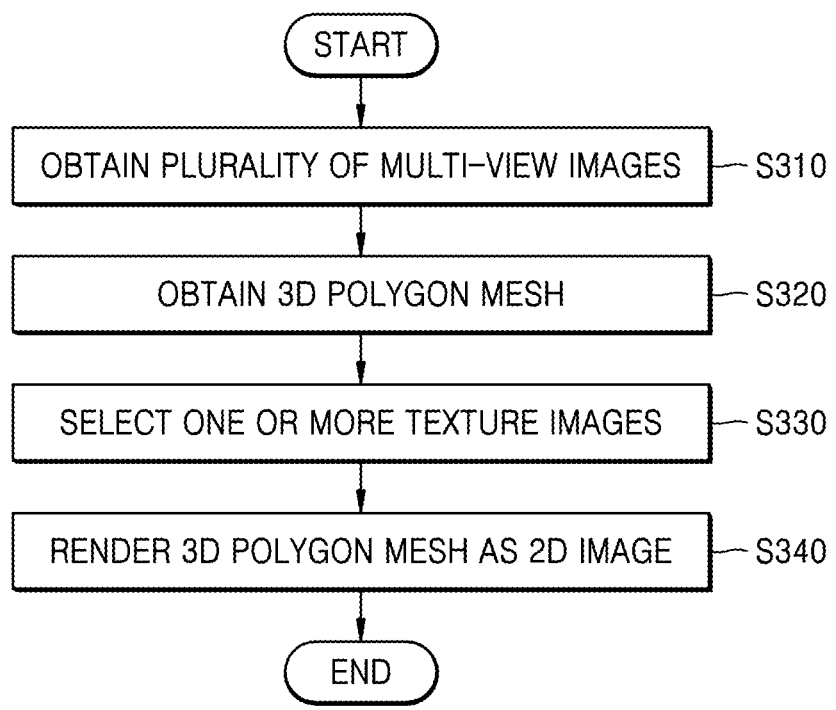
FIG. 3 is a flowchart of an operating method of a 3D polygon mesh rendering apparatus according to an embodiment of the disclosure.

FIG. 2 is a diagram illustrating an operation of a 3D polygon mesh rendering apparatus according to an embodiment of the disclosure. FIG. 3 is a flowchart of an operating method of a 3D polygon mesh rendering apparatus according to an embodiment of the disclosure. Referring to FIG. 3, the processor 110 of the 3D polygon mesh rendering apparatus 100 may obtain a plurality of multi-view images corresponding to a plurality of captured images obtained by capturing an object at different capture camera positions in operation S310.

Figure 4:
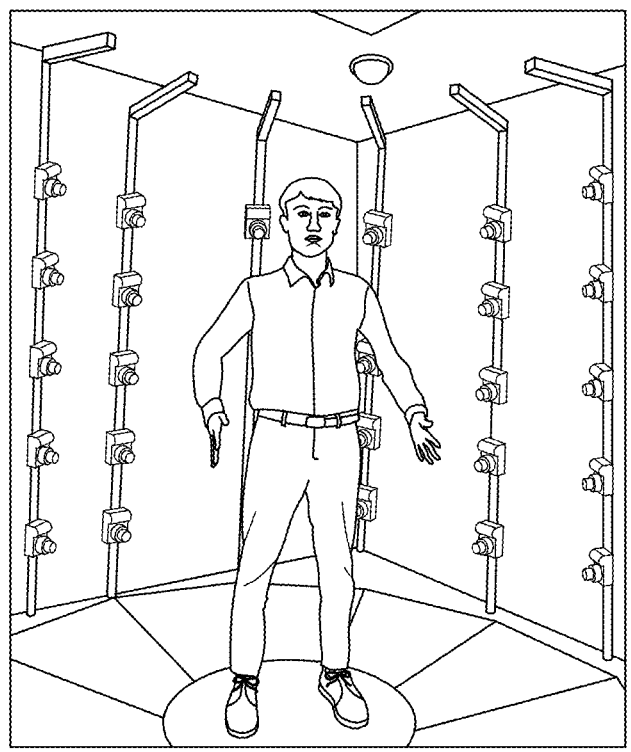
FIG. 4 is an illustration of a 3D capture system for obtaining a plurality of captured images of an object.

The plurality of captured images obtained by capturing an object may be obtained using known methods. FIG. 4 is an illustration of a 3D capture system for obtaining a plurality of captured images. Referring to FIG. 4, a plurality of captured images may be obtained by capturing an object by a plurality of cameras arranged at different positions. In this case, the position of a camera that capture the object is referred to as a 'capture camera position', and the position of a camera that has captured each captured image is referred to as a capture camera position of the captured image. In an embodiment, the capture camera position may be expressed as a position relative to a certain position (e.g., the center of the 3D capture system, or the center of an object). In this way, when a plurality of cameras are used, an object may be simultaneously captured at different capture camera positions. In another embodiment, a plurality of captured images may be obtained by capturing an object a plurality of times while changing the position of one camera. In addition, a plurality of captured images may be obtained by using various multi-view capture methods.

Each of the plurality of multi-view images is an image corresponding to each of the plurality of captured images. The multi-view image may be an image obtained by transforming a corresponding captured image, or may be an image generated based on a corresponding captured image. For example, as shown in FIG. 2, multi-view images 210 may be obtained by performing alpha matting 240 on captured images. In this case, the multi-view images 210 may include an alpha channel, and the alpha channel may include alpha values for an object. The capture camera position of each captured image may be regarded as the position of a capture camera of a corresponding multi-view image. That is, the position of a capture camera of each multi-view image is the position of a camera that has captured a corresponding captured image. The multi-view image may be a corresponding captured image itself. That is, a captured image obtained by capturing an object by a camera may be used as a multi-view image as it is.

Referring back to FIG. 3, the processor 110 of the 3D polygon mesh rendering apparatus 100 may obtain a 3D polygon mesh for the object in operation S320. The 3D polygon mesh for the object may be obtained using known 3D reconstruction methods. For example, as shown in FIG. 2, a 3D polygon mesh 220 for an object may be obtained by applying 3D reconstruction 250 to all or some of a plurality of captured images obtained by capturing the object. The 3D polygon mesh 220 for an object may be obtained by applying the 3D reconstruction to a plurality of multi-view images 210. The 3D polygon mesh 220 may be obtained using a separate method without using the captured images.

Referring back to FIG. 3, the processor 110 of the 3D polygon mesh rendering apparatus 100 may select one or more of the plurality of multi-view images as one or more texture images based on a render camera position and capture camera positions of the plurality of multi-view images in operation S330. In this case, the render camera position refers to the position of a virtual camera oriented towards a 2D image when rendering a 3D polygon mesh as the 2D image. A virtual camera oriented towards a 2D image is called a render camera. In an embodiment, a viewing direction of the render camera may be toward the center of an object.

In operation S340, the processor 110 of the 3D polygon mesh rendering apparatus 100 may render the 3D polygon mesh as a 2D image based on one or more selected texture images. As such, the 3D polygon mesh rendering apparatus 100 may not use all of the obtained multi-view images as texture images, but may select some of the obtained multi-view images according to the render camera position and use the selected multi-view images as texture images. The 2D image may include an alpha channel, and the 3D polygon mesh rendering apparatus 100 may determine alpha values of the 2D image based on alpha values of one or more selected texture images.

Generated 2D image may be synthesized (synthesis 260) with a background image to generate a final image. The synthesis 260 may include alpha blending. At least one of the alpha matting 240, the 3D reconstruction 250, and the synthesis 260 may be performed by the 3D polygon mesh rendering apparatus 100. The 3D polygon mesh rendering apparatus 100 may obtain a plurality of captured images and perform alpha matting on the plurality of captured images to generate multi-view images including an alpha channel. The 3D polygon mesh rendering apparatus 100 may obtain a plurality of captured images and perform 3D reconstruction on the plurality of captured images to generate a 3D polygon mesh. The 3D polygon mesh rendering apparatus 100 may obtain a background image and generate a final image by synthesizing a 2D image of an object with the obtained background image. The 3D polygon mesh rendering apparatus 100 may generate a final image by alpha-blending the 2D image of the object with the background image.

Figure 5:
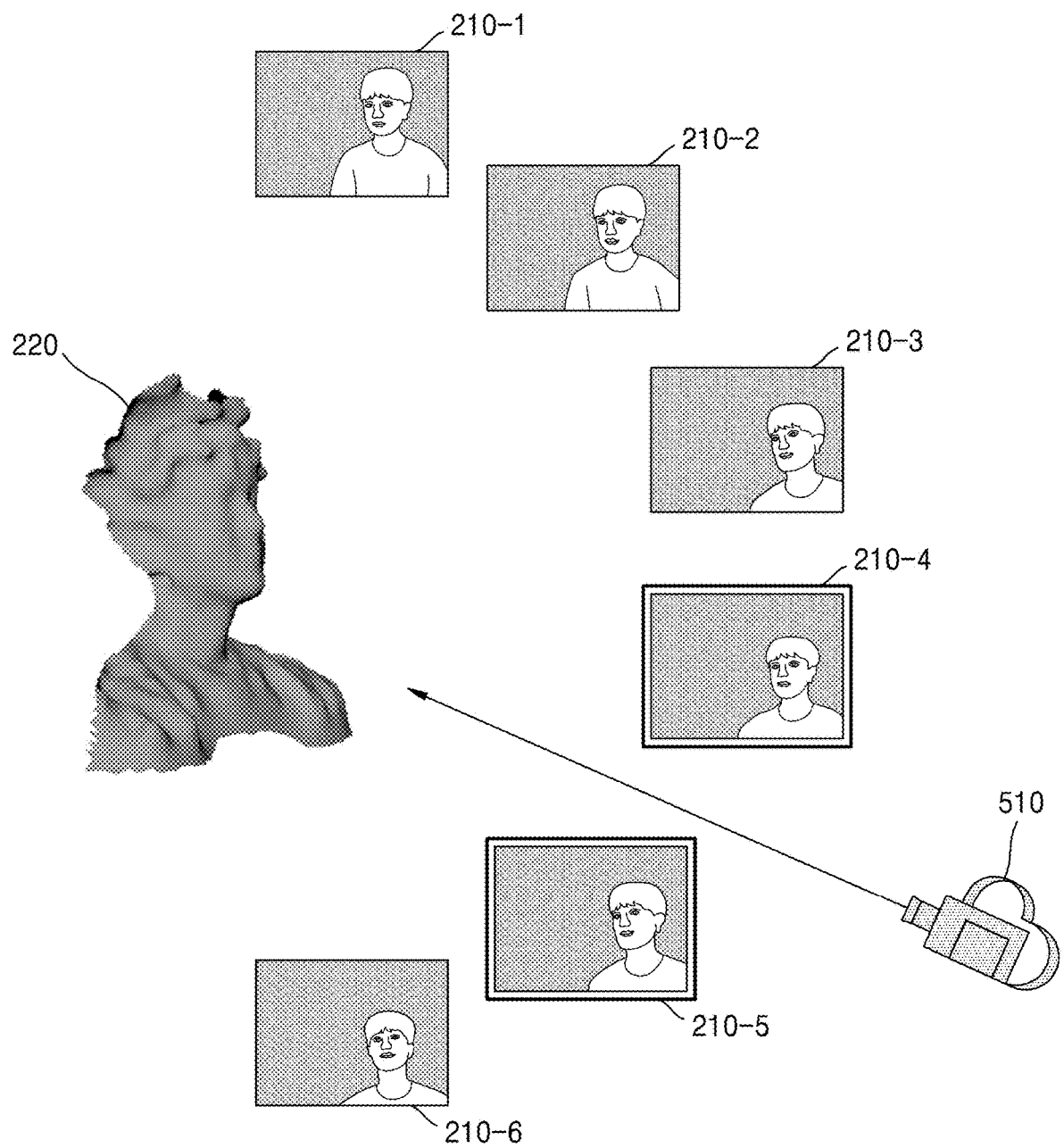
FIG. 5 is a diagram illustrating an example in which a 3D polygon mesh rendering apparatus selects one or more texture images, according to an embodiment of the disclosure.

FIG. 5 is a diagram illustrating an example in which the 3D polygon mesh rendering apparatus 100 selects one or more texture images, according to an embodiment of the disclosure. Referring to FIG. 5, the 3D polygon mesh rendering apparatus 100 may select, as texture images, two multi-view images 210-4 and 210-5 for which the position of a capture camera is close to the position 510 of a render camera from among a plurality of multi-view images 210-1 to 210-6 related to the 3D polygon mesh 220. As described above, the 3D polygon mesh rendering apparatus 100 may obtain a 2D image close to the actual appearance of the object by using, as a texture image, an image captured at a position close to the position 510 of the render camera.

The 3D polygon mesh rendering apparatus 100 may use the selected texture images to render the entire 3D polygon mesh, or may use the selected texture images to render a part (e.g., one vertex or one polygon) of the 3D polygon mesh. For example, the 3D polygon mesh rendering apparatus 100 may select one or more texture images for rendering each vertex. The 3D polygon mesh rendering apparatus 100 may select one or more texture images for rendering a part of a 3D polygon mesh including a plurality of vertices or a plurality of polygons.

The 3D polygon mesh rendering apparatus 100 may select one or more first texture images for rendering a first point of the 3D polygon mesh and select one or more second texture images for rendering a second point of the 3D polygon mesh. In this case, the first point and the second point may be points on the surface of the 3D polygon mesh. The first point and the second point may be vertices of the 3D polygon mesh. The first point and the second point may be points displayed on the 2D image. The 3D polygon mesh rendering apparatus 100 may select one or more of a plurality of multi-view images as one or more first texture images, based on the position of the first point of the 3D polygon mesh, the render camera position, and the capture camera positions of the plurality of multi-view images, and render the first point as a 2D image based on the selected one or more first texture images, and may select one or more of the plurality of multi-view images as one or more second texture images, based on the position of the second point of the 3D polygon mesh, the render camera position, and the capture camera positions of the plurality of multi-view images, and render the second point as a 2D image based on the selected one or more second texture images.

Figure 6:
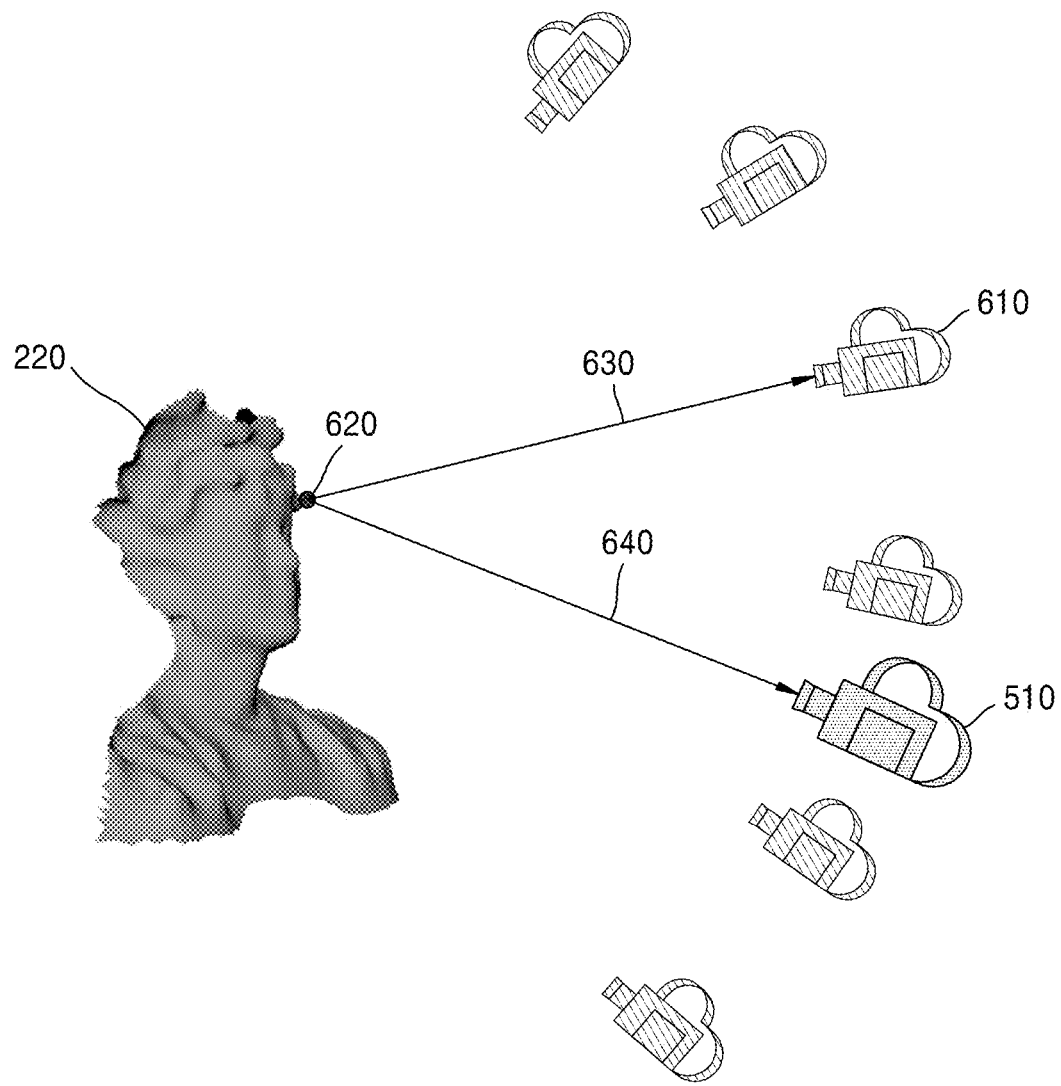
FIG. 6 is a diagram illustrating a capture camera position vector and a render camera position vector.

The 3D polygon mesh rendering apparatus 100 may select one or more of a plurality of multi-view images as one or more first texture images, based on a render camera position relative to the position of the first point and capture camera positions of a plurality of multi-view images relative to the position of the first point, and may select one or more of the plurality of multi-view images as one or more second texture images, based on a render camera position relative to the position of the second point and capture camera positions of a plurality of multi-view images relative to the position of the second point. In this case, the render camera position relative to the position of the first point may be referred to as a render camera position vector based on the position of the first point. The capture camera position relative to the position of the first point may be referred to as a capture camera position vector based on the position of the first point. Also, the same applies to the second point. FIG. 6 is a diagram illustrating a capture camera position vector and a render camera position vector. Referring to FIG. 6, a first point 620 is one of the vertices of a 3D polygon mesh 220, a vector 630 from the first point 620 toward a capture camera position 610 is a capture camera position vector based on the first point 620, and a vector 640 from the first point 620 toward a render camera position 510 is a render camera position vector based on the first point 620.

The 3D polygon mesh rendering apparatus 100 may select, as texture images, k images for which the position of a capture camera is closest to the position of a render camera from among a plurality of multi-view images. In this case, k may be, for example, 1, 3, or 8. The 3D polygon mesh rendering apparatus 100 may select a plurality of images from among a plurality of multi-view images as texture images. When a plurality of texture images are used, a natural animation effect may be obtained without a sense of disconnection when the position of a render camera is moved. The 3D polygon mesh rendering apparatus 100 may select, as texture images, images for which the position of a capture camera is within a certain range with respect to the position of a render camera from among a plurality of multi-view images. The 3D polygon mesh rendering apparatus 100 may select, as texture images, images for which a capture camera position is within a certain angle from a render camera position with respect to the center of an object from among a plurality of multi-view images. The 3D polygon mesh rendering apparatus 100 selects, as texture images, images for which a capture camera position is within a certain angle from a render camera position with respect to a certain position (e.g., a point to be rendered) of an object from among a plurality of multi-view images.

The 3D polygon mesh rendering apparatus 100 may determine a weight based on a render camera position for each of the multi-view images and select one or more texture images based on the determined weight. The 3D polygon mesh rendering apparatus 100 may determine a weight of each of a plurality of multi-view images based on a render camera position and capture camera positions of the plurality of multi-view images and select one or more of the plurality of multi-view images as one or more texture images based on the determined weight. In an embodiment, the 3D polygon mesh rendering apparatus 100 may determine the weight of the multi-view image to be higher as a capture camera position is closer to a render camera position.

The 3D polygon mesh rendering apparatus 100 may determine weights based on a render camera position relative to the position of the first point of the 3D polygon mesh and capture camera positions of a plurality of multi-view images relative to the position of the first point. In this case, the first point may be the center of the 3D polygon mesh or the center of the object. The first point may be a vertex of the 3D polygon mesh. The first point may be a point to be rendered as a 2D image. The 3D polygon mesh rendering apparatus 100 may determine weights such that an error between a weighted sum of capture camera position vectors of a plurality of multi-view images based on the position of the first point of the 3D polygon mesh according to the weights and a render camera position vector based on the position of the first point is minimized. The 3D polygon mesh rendering apparatus 100 may determine the weights by using Equation (1) below.

$$\underset{w}{\arg\min} \left\| \sum_{i=1}^{N} w_i C_i - V \right\|^2 \text{ wherein } \sum_{i=1}^{N} w_i = 1, 0 \le w_i \le 1 \quad (1)$$

$W_i$ is a weight of an i-th multi-view image, $C_i$ is a capture camera position vector of the i-th multi-view image based on the position of a first point, V is a render camera position vector based on the position of the first point, and N is the number of multi-view images.

The 3D polygon mesh rendering apparatus 100 may select, as a texture image, a multi-view image having a weight equal to or greater than a predefined threshold from among the multi-view images. The 3D polygon mesh rendering apparatus 100 may select one or more texture images such that the sum of the weights of selected texture images is equal to or greater than a predefined threshold. The 3D polygon mesh rendering apparatus 100 may select an image having a non-zero weight as a texture image. Selecting texture images from among the multi-view images may include determining the weights of some of the multi-view images to be 0. As will be seen later, when the weight of a multi-view image is determined to be 0, the multi-view image may not be used in 2D rendering. When the sum of the weights of selected texture images is not 1, the 3D polygon mesh rendering apparatus 100 may normalize the weights such that the sum of the weights becomes 1.

The 3D polygon mesh rendering apparatus 100 may use the determined weights to render the entire 3D polygon mesh or to render a part (e.g., one vertex) of the 3D polygon mesh. For example, the 3D polygon mesh rendering apparatus 100 may determine weights for rendering each vertex.

The 3D polygon mesh rendering apparatus 100 may select one or more first weights for rendering a first point of the 3D polygon mesh and select one or more second weights for rendering a second point of the 3D polygon mesh. In this case, the first point and the second point may be points on the surface of the 3D polygon mesh. The first point and the second point may be vertices of the 3D polygon mesh. The first point and the second point may be points displayed on the 2D image. The 3D polygon mesh rendering apparatus 100 may determine a first weight of each of a plurality of multi-view images, based on the position of the first point, the render camera position, and the capture camera positions of the plurality of multi-view images, and select one or more of the plurality of multi-view images as one or more first texture images based on the determined first weights, and may determine a second weight of each of the plurality of multi-view images, based on the position of the second point, the render camera position, and the capture camera positions of the plurality of multi-view images, and select one or more of the plurality of multi-view images as one or more second texture images based on the determined second weights. The 3D polygon mesh rendering apparatus 100 may render the first point as a 2D image based on one or more selected first texture images and may render the second point as a 2D image based on one or more selected second texture images.

The 3D polygon mesh rendering apparatus 100 may determine first weights based on a render camera position relative to the position of the first point and capture camera positions of a plurality of multi-view images relative to the position of the first point, and may determine second weights based on a render camera position relative to the position of the second point and capture camera positions of a plurality of multi-view images relative to the position of the second point. The 3D polygon mesh rendering apparatus 100 may determine the first weights such that an error between a weighted sum of capture camera position vectors of a plurality of multi-view images based on the position of the first point according to the first weights and a render camera position vector based on the position of the first point is minimized. In addition, the 3D polygon mesh rendering apparatus 100 may determine the second weights such that an error between a weighted sum of capture camera position vectors of a plurality of multi-view images based on the position of the second point according to the second weights and a render camera position vector based on the position of the second point is minimized. The 3D polygon mesh rendering apparatus 100 may determine the first weights and the second weights by using Equation (1).

Figure 7:
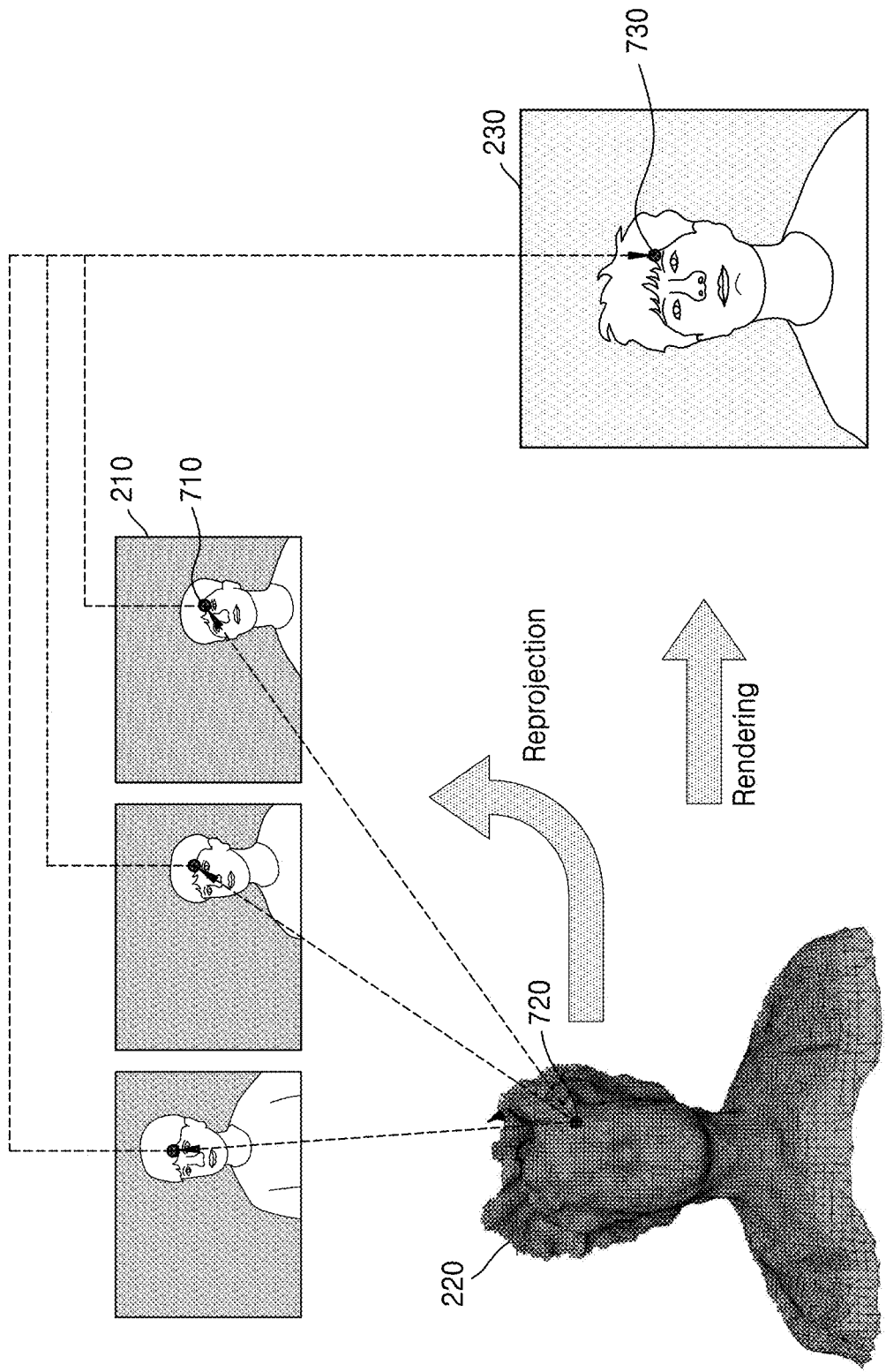
FIG. 7 is a diagram illustrating a method used by a 3D polygon mesh rendering apparatus to render a 3D polygon mesh as a two-dimensional (2D) image based on one or more selected texture images, according to an embodiment of the disclosure.

FIG. 7 is a diagram illustrating a method in which a 3D polygon mesh rendering apparatus renders a 3D polygon mesh as a 2D image based on one or more selected texture images, according to an embodiment of the disclosure. Referring to FIG. 7, the 3D polygon mesh rendering apparatus 100 may determine points (i.e., texture points 710) on texture images corresponding to a first point 720 of a 3D polygon meth 220 by re-projecting the first point 720 of the 3D polygon mesh 220 onto each of one or more texture images 210. For convenience of description, points in the texture images will be referred to as texture points. In this case, the first point 720 may be a point on the surface of the 3D polygon mesh. The first point may be a vertex of the 3D polygon mesh. The first point may be a point to be rendered as a 2D image. The first point may be a point displayed on the 2D image. Determining a texture point may be determining the position of a texture point on a texture image. Determining a texture point may be determining u, v coordinate values of a texture point on a texture image.

The 3D polygon mesh rendering apparatus 100 may determine the color of a point 730 on a 2D image 230 corresponding to the first point 720 based on the colors of the determined one or more texture points 710. For convenience of description, a point in the 2D image will be referred to as a rendering point. The 3D polygon mesh rendering apparatus 100 may determine one or more first texture points 710 on one or more texture images corresponding to the first point 720 of the 3D polygon meth 220 by re-projecting the first point 720 of the 3D polygon mesh 220 onto each of one or more texture images 210, and may determine the color of a first rendering point (i.e., the point 730) on the 2D image 230 corresponding to the first point 720 based on the colors of the one or more texture points 710. For example, the 3D polygon mesh rendering apparatus 100 may determine an average value of RGB values of the first texture points as an RGB value of the first rendering point.

The 3D polygon mesh rendering apparatus 100 may determine an alpha value of the first rendering point based on alpha values of one or more first texture points. For example, the 3D polygon mesh rendering apparatus 100 may determine an average value of alpha values of the first texture points as an alpha value of the first rendering point.

The 3D polygon mesh rendering apparatus 100 may obtain camera parameters determined in a process of generating a 3D polygon mesh through 3D reconstruction based on a plurality of captured images and perform re-projection by using the obtained camera parameters.

The 3D polygon mesh rendering apparatus 100 may determine a color of a rendering point by using the weights of texture images. In an embodiment, the 3D polygon mesh rendering apparatus 100 may determine the weight of a corresponding texture image to be higher as a capture camera position is closer to a render camera position. The 3D polygon mesh rendering apparatus 100 may determine the weight of each of the one or more texture images based on a render camera position and capture camera positions of the one or more texture images, and may determine the color of the first rendering point based on the determined weights and the colors of the one or more first texture points. For example, the 3D polygon mesh rendering apparatus 100 may determine a weighted sum of RGB values of the first texture points as an RGB value of the first rendering point by using the determined weights. In this case, when the sum of the weights of texture images is not 1, the 3D polygon mesh rendering apparatus 100 may normalize the weights such that the sum of the weights becomes 1. The 3D polygon mesh rendering apparatus 100 may determine the color of the first rendering point by using Equation below.

$$\text{Rendering color} = \sum_{i=1}^{M} w'_i \, \text{TextureImage}_i(u, v)$$

In this case, $W'_i$ is a weight of an i-th texture image, $\text{TextureImage}_i(u,v)$ is a color of a texture point at coordinates u, v on the i-th texture image, Rendering color is a color of a corresponding rendering point, and M is the number of texture images. M may be the same as or different from N in Equation (1). $W'_i$ may be the same as or different from $W_i$ in Equation (1). The above equation may be applied to each RGBA (Red, Green, Blue, Alpha) channel.

The 3D polygon mesh rendering apparatus 100 may determine an alpha value of the first rendering point based on the determined weights and alpha values of the one or more first texture points. For example, the 3D polygon mesh rendering apparatus 100 may determine a weighted sum of the alpha values of the first texture points as the alpha value of the first rendering point by using the determined weights.

The 3D polygon mesh rendering apparatus 100 may select one or more texture images from among multi-view images and then determine weights for the selected one or more texture images, and may determine weights for all of the multi-view images and then select one or more texture images from among the multi-view images. Determining weights for all of the multi-view images may use the method described above, and a method for determining weights for one or more selected texture images may be performed in a similar manner. Images with zero weight may not be used for 2D rendering.

The 3D polygon mesh rendering apparatus 100 may determine weights based on an error between a weighted sum of capture camera position vectors of one or more texture images based on the position of a first point of a 3D polygon mesh according to the weights and a render camera position vector based on the position of the first point. The 3D polygon mesh rendering apparatus 100 may determine the weights to minimize the error. The 3D polygon mesh rendering apparatus 100 may determine the weights by using Equation (2) below.

$$\underset{w'}{\arg\min} \left\| \sum_{i=1}^{M} w'_i C'_i - V \right\|^2 \text{ wherein } \sum_{i=1}^{M} w'_i = 1, 0 \le w'_i \le 1 \quad (2)$$

$W'_i$ is a weight of an i-th texture image, $C'_i$ is a capture camera position vector of the i-th texture image based on the position of a first point, V is a render camera position vector based on the position of the first point, and M is the number of texture images.

The 3D polygon mesh rendering apparatus 100 may determine the weights of texture images by determining the weights of multi-view images such that an error between a weighted sum of capture camera position vectors of a plurality of multi-view images based on the position of the first point according to the weights and a render camera position vector based on the position of the first point is minimized. The 3D polygon mesh rendering apparatus 100 may determine the weights of texture images by determining the weights of multi-view images by using Equation (1).

The 3D polygon mesh rendering apparatus 100 may use the determined weights to render the entire 3D polygon mesh or to render a part (e.g., one vertex) of the 3D polygon mesh. For example, the 3D polygon mesh rendering apparatus 100 may determine weights for determining the color of a rendering point on a 2D image corresponding to each vertex.

The 3D polygon mesh rendering apparatus 100 may select one or more first weights for rendering a first point of the 3D polygon mesh and select one or more second weights for rendering a second point of the 3D polygon mesh. The 3D polygon mesh rendering apparatus 100 may determine a first weight of each of the one or more texture images based on the position of the first point, a render camera position, and capture camera positions of the one or more texture images, and may determine the color of a first rendering point based on the determined first weights and the colors of one or more first texture points. In addition, the 3D polygon mesh rendering apparatus 100 may determine one or more second texture points on one or more texture images corresponding to the first point by re-projecting the second point onto each of the one or more texture images, determine a second weight of each of the one or more texture images based on the position of the second point, the render camera position, and the capture camera positions of the one or more texture images, and determine the color of a second rendering point on a 2D image corresponding to the second point.

The 3D polygon mesh rendering apparatus 100 may determine first weights based on a render camera position relative to the position of the first point and capture camera positions of one or more texture images relative to the position of the first point, and may determine second weights based on a render camera position relative to the position of the second point and capture camera positions of one or more texture images relative to the position of the second point.

The 3D polygon mesh rendering apparatus 100 may determine the first weights based on an error between a weighted sum of capture camera position vectors of one or more texture images based on the position of the first point according to the first weights and a render camera position vector based on the position of the first point. In addition, the 3D polygon mesh rendering apparatus 100 may determine the second weights based on an error between a weighted sum of capture camera position vectors of one or more texture images based on the position of the second point according to the second weights and a render camera position vector based on the position of the second point. The 3D polygon mesh rendering apparatus 100 may determine the first weights and the second weights by using Equation (2). The 3D polygon mesh rendering apparatus 100 may determine first weights of texture images for the first point and second weights of texture images for the second point by determining the weights of multi-view images for the first point and the second point by using Equation (1).

Figure 8:
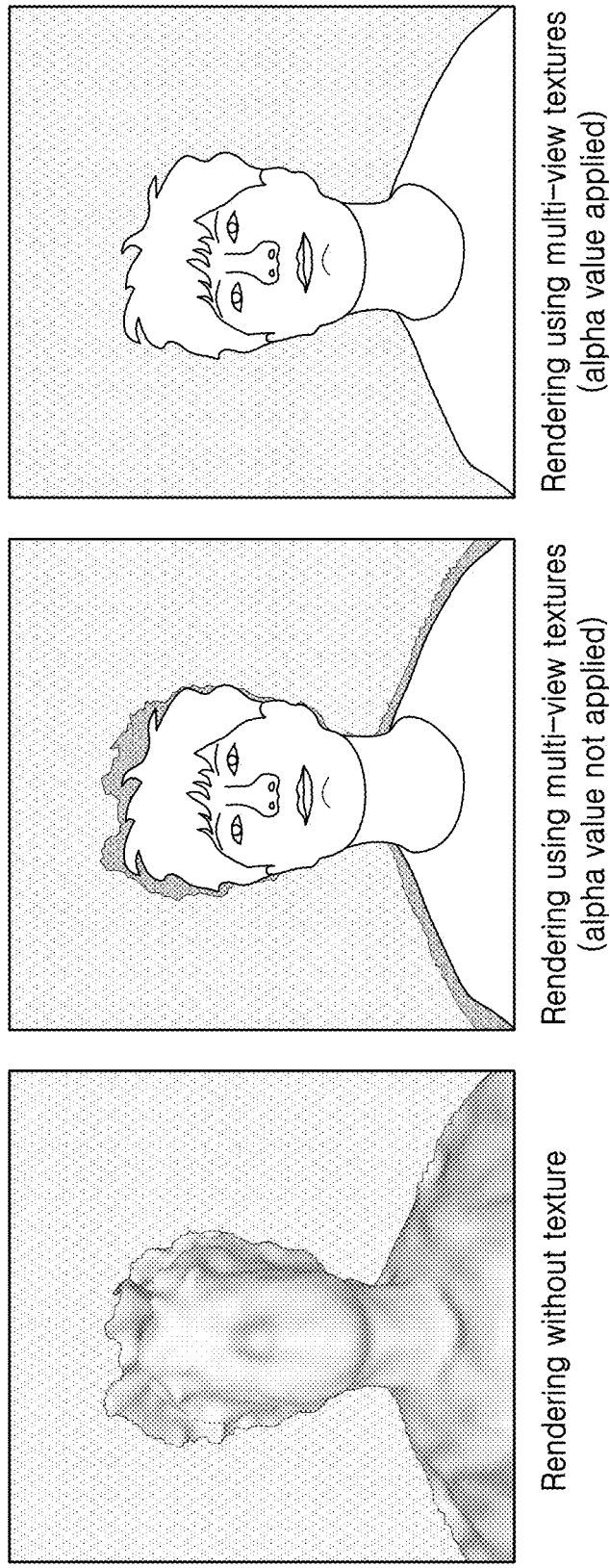
FIG. 8 is a diagram illustrating a 2D image generated by a 3D polygon mesh rendering method according to an embodiment of the disclosure.

FIG. 8 is a diagram illustrating a 2D image generated by a 3D polygon mesh rendering method according to an embodiment of the disclosure. The first figure of FIG. 8 is a 2D image generated by rendering a 3D polygon mesh without a texture image, according to an embodiment of the disclosure. The second figure of FIG. 8 is a 2D image generated by rendering a 3D polygon mesh based on a texture image without using an alpha value, according to an embodiment of the disclosure. The third figure of FIG. 8 is a 2D image generated by rendering a 3D polygon mesh using an alpha value based on a texture image, according to an embodiment of the disclosure. As shown in FIG. 8, when the alpha value is used, details such as a silhouette of hair at the edge of an object may be delicately expressed as in reality. Because existing 3D polygon mesh rendering methods use a 2D texture map in which polygons are unfolded, it is impossible to use an alpha value because a texture image is not an image viewed from a certain direction. However, in the 3D polygon mesh rendering method according to an embodiment of the disclosure, an alpha value may be used because a texture image is selected based on a render camera position and the color of a 2D image is determined based on the color of the selected texture image, and accordingly, silhouette details of images may be delicately expressed.

Figure 9:
FIGS. 9 to 11 are diagrams for comparing a 2D image obtained by using a 3D polygon mesh rendering method according to an embodiment of the disclosure with a 2D image obtained by using an existing 3D polygon mesh rendering method.
Figure 9:
Figure 10:
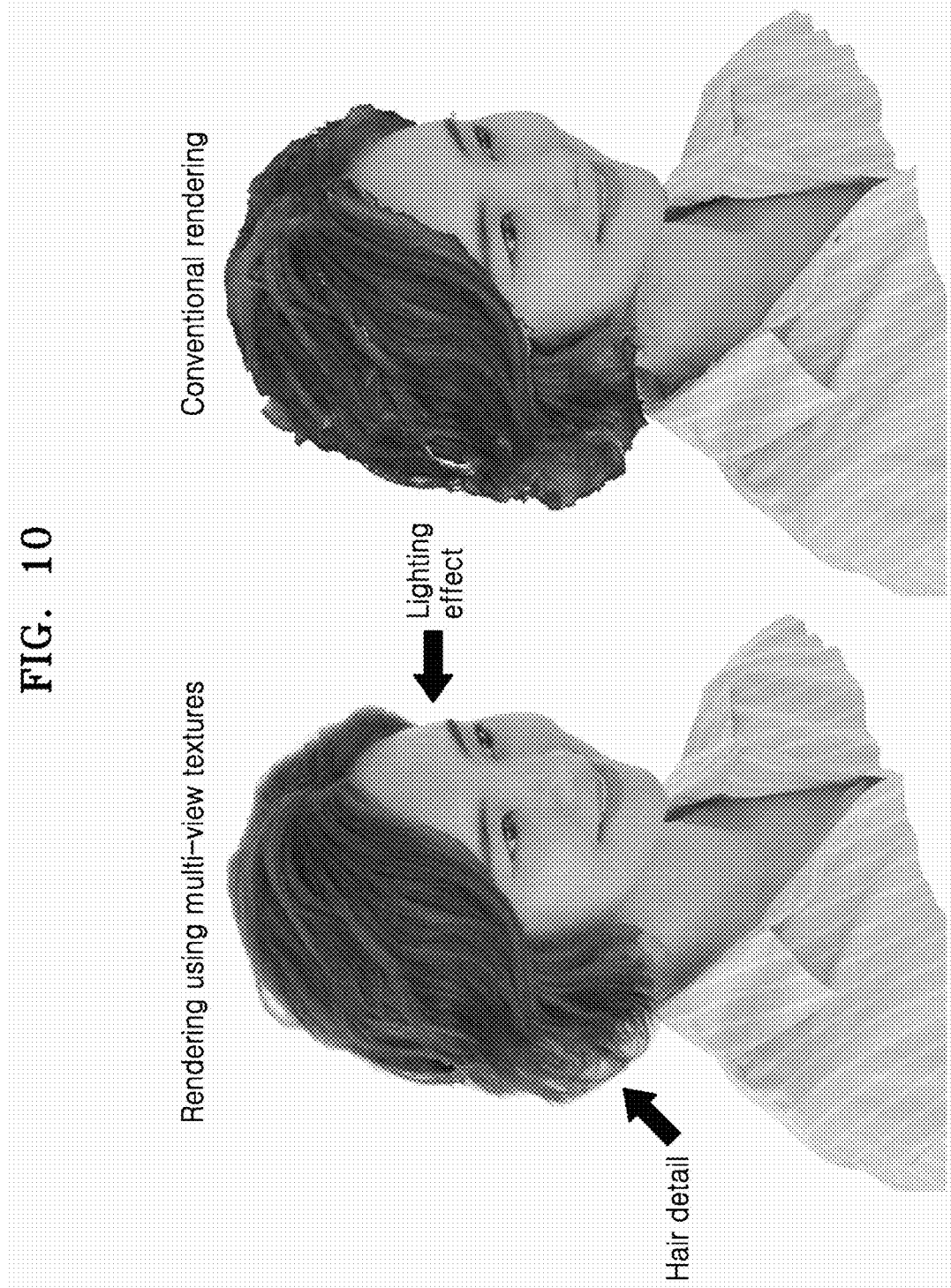
Figure 11:
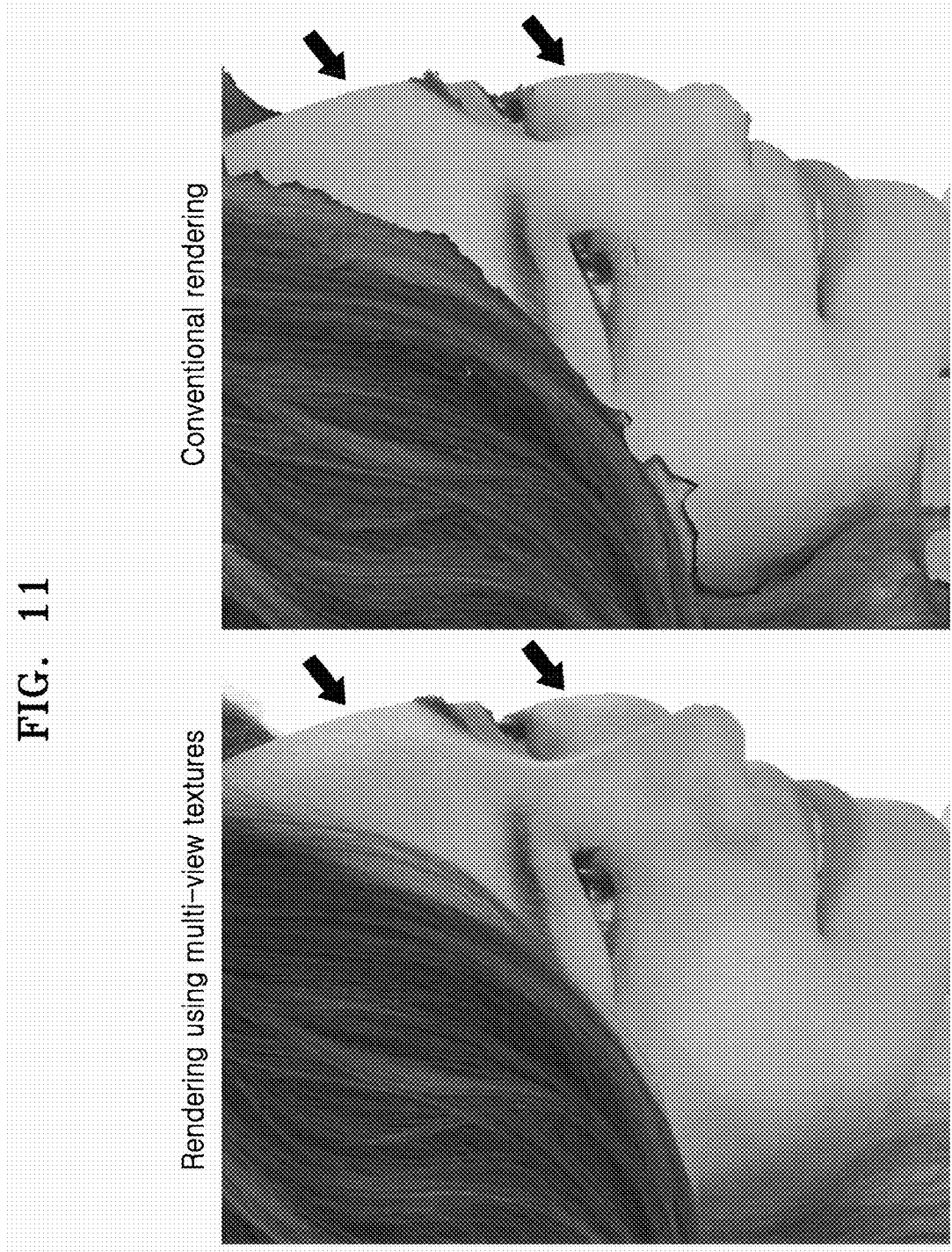

FIGS. 9 to 11 are diagrams comparing a 2D image by a 3D polygon mesh rendering method according to an embodiment of the disclosure with a 2D image by an existing 3D polygon mesh rendering method. In each of FIGS. 9 to 11, a first figure is a 2D image of an object by a 3D polygon mesh rendering method according to an embodiment of the disclosure, and a second figure is a 2D image of an object by an existing 3D polygon mesh rendering method.

Referring to FIG. 9, it may be seen that the 2D image by the 3D polygon mesh rendering method according to the embodiment of the disclosure has much finer silhouette details (e.g., hair) than the 2D image by the existing method and is similar to a real object. In addition, it may be seen that a lighting effect is clearly shown in the 2D image by the 3D polygon mesh rendering method according to the embodiment of the disclosure than in the 2D image by the existing method. The lighting effect appears different depending on the position from which an object is viewed, that is, the position of a capture camera. In the existing 3D polygon mesh rendering method, a lighting effect according to the position of a capture camera does not appear because the colors of captured images obtained by capturing an object at several positions are averaged to generate a 2D texture map in which polygons are unfolded, and thus, it is not possible to generate a lighting effect according to a render camera position because the same texture is applied regardless of the render camera position to generate a 3D image. On the other hand, according to the 3D polygon mesh rendering method according to an embodiment of the disclosure, some images are selected according to a render camera position from among captured images obtained by capturing an object at several positions and used as a texture image, and thus, a lighting effect when viewed from a render camera position may be expressed as it is. Similarly in FIG. 10, it may be seen that the 2D image by the 3D polygon mesh rendering method according to the embodiment of the disclosure has better silhouette detail and lighting effect than the 2D image by the existing method.

Referring to FIG. 11, it may be seen that, unlike in the 2D image by the existing method, in the 2D image by the 3D polygon mesh rendering method according to the embodiment of the disclosure, a lighting effect is clearly expressed on a person's forehead and cheeks. In addition, in the existing 3D polygon mesh rendering method, the sharpness of images is significantly lowered because the colors of all captured images obtained by capturing an object at several positions are averaged to generate a 2D texture map in which polygons are unfolded, but according to the 3D polygon mesh rendering method according to the embodiment of the disclosure, the sharpness of images is very high because only the colors of a small number (e.g., 1, 3, or 8) of images are used. In addition, the image sharpness may be further increased by applying a weight according to the position of a render camera without averaging the colors of texture images to be used.

According to the 3D polygon mesh rendering method according to the embodiment of the disclosure, the quality of textures is very good, and thus, even though a small number of polygons is used, the quality of results is high. Therefore, according to the 3D polygon mesh rendering method according to the embodiment of the disclosure, a high-quality 2D image may be obtained while reducing data size and improving an operation speed by using a 3D polygon mesh including a small number of polygons. According to the 3D polygon mesh rendering method according to the embodiment of the disclosure, a person may be 3D-modeled using a plurality of captured images taken at several positions to thereby render a 2D image almost identical to that of the person, and thus, an avatar that looks and talks just like a real person may be generated.

Embodiments of the disclosure may be implemented as computer-executable code stored in a computer-readable recording medium. Examples of the computer-readable recording medium include all recording media such as a magnetic medium, an optical medium, read-only memory (ROM), and random-access memory (RAM). The computer-readable recording medium may be provided as a non-transitory storage medium. Here, 'non-transitory' means that the storage medium does not include a signal and is tangible, but does not distinguish whether data is stored semi-permanently or temporarily on the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be stored and distributed in a computer-readable recording medium, or may be distributed (e.g., downloaded or uploaded) online via an application store (e.g., Play Store™) or between two user devices (e.g., smartphones) directly. When distributed online, at least a part of the computer program product (e.g., a downloadable application) may be temporarily generated or at least temporarily stored in a computer-readable recording medium such as a memory of a manufacturer's server, a server of the application store, or a relay server.

An embodiment of the disclosure provides a 3D polygon mesh rendering method and apparatus using a multi-view texture to obtain an image closer to reality than in the existing method in terms of sharpness, lighting effect, and silhouette detail.

The disclosure has been described in detail with the exemplary embodiments of the disclosure shown in the drawings. The embodiments of the disclosure are only illustrative without limiting the disclosure and should be understood in the illustrative sense only and not for the purpose of limitation in all aspects. It will be understood by those of ordinary skill in the art to which the disclosure belongs that various changes in form and details may be made in the embodiments of the disclosure without changing the technical spirit and mandatory features of the disclosure. For example, each component described as a single type may be carried out by being distributed, and likewise, components described as a distributed type may also be carried out by being coupled. All features and/or operations of the disclosure, including the claims and drawings, may be combined in any combination, unless at least some of the features and/or operations are contrary to each other. Although specific terms are used in the specification, the terms are for the purpose of describing the disclosure only and are not intended to be limiting of the meaning or the scope of the disclosure as defined by the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for rendering a three-dimensional (3D) polygon mesh, the apparatus comprising:
  a processor; and
  a memory storing instructions,
  wherein the processor is configured to execute the instructions to:
   obtain a plurality of multi-view images corresponding to a plurality of captured images obtained by capturing an object at different capture camera positions,
   obtain a 3D polygon mesh for the object,
   determine a weight of each of the plurality of multi-view images based on a render camera position and the capture camera positions of the plurality of multi-view images,
   select one or more of the plurality of multi-view images as one or more texture images based on the weights of the plurality of multi-view images, and
   render the 3D polygon mesh as a two-dimensional (2D) image based on the selected one or more texture images,
   wherein the weights are determined such that an error between a weighted sum of capture camera position vectors of the plurality of multi-view images based on a position of a first point of the 3D polygon mesh according to the weights and a render camera position vector based on the position of the first point is minimized.

2. The apparatus of claim 1, wherein the each of the plurality of multi-view images and the 2D image includes an alpha channel, and
  wherein the processor is further configured to execute the instructions to determine alpha values of the 2D image based on alpha values of the selected one or more texture images.

3. The apparatus of claim 1, wherein the processor is further configured to execute the instructions to
  select one or more of the plurality of multi-view images as one or more first texture images based on the position of the first point of the 3D polygon mesh, the render camera position, and the capture camera positions of the plurality of multi-view images,
  render the first point into the 2D image based on the selected one or more first texture images,
  select one or more of the plurality of multi-view images as one or more second texture images based on a position of a second point of the 3D polygon mesh, the render camera position, and the capture camera positions of the plurality of multi-view images, and
  render the second point into the 2D image based on the selected one or more second texture images.

4. The apparatus of claim 3, wherein the processor is further configured to execute the instructions to
  select one or more of the plurality of multi-view images as the one or more first texture images based on the render camera position relative to the position of the first point and the capture camera positions of the plurality of multi-view images relative to the position of the first point, and
  select one or more of the plurality of multi-view images as the one or more second texture images based on the render camera position relative to the position of the second point and the capture camera positions of the plurality of multi-view images relative to the position of the second point.

5. The apparatus of claim 3, wherein the processor is further configured to execute the instructions to
  determine a first weight of each of the plurality of multi-view images based on the position of the first point, the render camera position, and the capture camera positions of the plurality of multi-view images,
  select one or more of the plurality of multi-view images as the one or more first texture images based on the first weights,
  determine a second weight of each of the plurality of multi-view images based on the position of the second point, the render camera position, and the capture camera positions of the plurality of multi-view images, and
  select one or more of the plurality of multi-view images as the one or more second texture images based on the second weights.

6. The apparatus of claim 5, wherein the processor is further configured to execute the instructions to
  determine the first weights based on the render camera position relative to the position of the first point and the capture camera positions of the plurality of multi-view images relative to the position of the first point, and
  determine the second weights based on the render camera position relative to the position of the second point and the capture camera positions of the plurality of multi-view images relative to the position of the second point.

7. The apparatus of claim 6, wherein the processor is further configured to execute the instructions to
  determine the first weights such that an error between a weighted sum of capture camera position vectors of the plurality of multi-view images based on the position of the first point according to the first weights and a render camera position vector based on the position of the first point is minimized, and
  determine the second weights such that an error between a weighted sum of capture camera position vectors of the plurality of multi-view images based on the position of the second point according to the second weights and a render camera position vector based on the position of the second point is minimized.

8. The apparatus of claim 1, wherein the processor is further configured to execute the instructions to
  determine one or more first texture points on the one or more texture images corresponding to the first point of the 3D polygon mesh by re-projecting the first point of the 3D polygon mesh onto each of the one or more texture images, and determine a color of a first rendering point on the 2D image corresponding to the first point based on colors of the one or more first texture points.

9. The apparatus of claim 8, wherein the processor is further configured to execute the instructions to
obtain camera parameters determined in a process of generating the 3D polygon mesh through 3D reconstruction based on the plurality of captured images, and
perform the re-projection by using the camera parameters.

10. The apparatus of claim 8, wherein
each of the plurality of multi-view images and the 2D image includes an alpha channel, and
wherein the processor is further configured to execute the instructions to
determine an alpha value of the first rendering point based on alpha values of the one or more first texture points.

11. The apparatus of claim 8, wherein the processor is further configured to execute the instructions to
determine a weight of each of the one or more texture images based on the render camera position and capture camera positions of the one or more texture images, and
determine a color of the first rendering point based on the weights and colors of the one or more first texture points.

12. The apparatus of claim 11, wherein
each of the plurality of multi-view images and the 2D image includes an alpha channel,
wherein the processor is further configured to execute the instructions to determine an alpha value of the first rendering point based on the weights and alpha values of the one or more first texture points.

13. The apparatus of claim 11, wherein the processor is further configured to execute the instructions to determine the weights such that an error between a weighted sum of capture camera position vectors of the one or more texture images based on the position of the first point according to the weights and the render camera position vector based on the position of the first point is minimized.

14. The apparatus of claim 11, wherein the processor is further configured to execute the instructions to
determine a first weight of each of the one or more texture images based on the position of the first point, the render camera position, and the capture camera positions of the one or more texture images,
determine the color of the first rendering point based on the first weights and the colors of the one or more first texture points,
determine one or more second texture points on the one or more texture images corresponding to a second point of the 3D polygon mesh by re-projecting the second point of the 3D polygon mesh onto each of the one or more texture images,
determine a second weight of each of the one or more texture images based on a position of the second point, the render camera position, and the capture camera positions of the one or more texture images, and determine a color of a second rendering point on the 2D image corresponding to the second point based on the second weights and colors of the one or more second texture points.

15. The apparatus of claim 14, wherein the processor is further configured to execute the instructions to
determine the first weights based on the render camera position relative to the position of the first point and capture camera positions of the one or more texture images relative to the position of the first point, and
determine the second weights based on the render camera position relative to the position of the second point and capture camera positions of the one or more texture images relative to the position of the second point.

16. The apparatus of claim 15, wherein the processor is further configured to execute the instructions to:
determine the first weights such that an error between a weighted sum of capture camera position vectors of the one or more text images based on the position of the first point according to the first weights and the render camera position vector based on the position of the first point is minimized, and
determine the second weights such that an error between a weighted sum of capture camera position vectors of the one or more text images based on the position of the second point according to the second weights and a render camera position vector based on the position of the second point is minimized.

17. An operating method of an apparatus for rendering a three-dimensional (3D) polygon mesh, the operating method comprising:
obtaining a plurality of multi-view images corresponding to a plurality of captured images obtained by capturing an object at different capture camera positions;
obtaining a 3D polygon mesh for the object;
determining a weight of each of the plurality of multi-view images based on a render camera position and the capture camera positions of the plurality of multi-view images;
selecting one or more of the plurality of multi-view images as one or more texture images based on the weights of the plurality of multi-view images; and
rendering the 3D polygon mesh as a two-dimensional (2D) image based on the selected one or more texture images,
wherein the weights are determined such that an error between a weighted sum of capture camera position vectors of the plurality of multi-view images based on a position of a first point of the 3D polygon mesh according to the weights and a render camera position vector based on the position of the first point is minimized.

18. A non-transitory computer-readable recording medium having recorded thereon a program for executing the operating method of claim 17.

* * * * *